United States Patent [19]

Hsu et al.

[11] Patent Number: 5,272,938
[45] Date of Patent: Dec. 28, 1993

[54] FLAT RIM TYPE MOTOR DRIVE MECHANISM FOR BICYCLES

[76] Inventors: Chi-Hsueh Hsu, 4F., No. 144, Chu Lin Rd., Yung Ho, Taipei; I-Ho Li, 5F., No. 21, Alley 16, Sec. 2, Chung Shan N. Rd., Taipei, both of Taiwan

[21] Appl. No.: 986,064

[22] Filed: Dec. 4, 1992

[51] Int. Cl.[5] .................. G05G 1/14; B60K 1/00; H02K 7/06
[52] U.S. Cl. .................. 74/594.1; 180/65.5; 180/65.6; 310/83
[58] Field of Search ............ 74/594.1–594.3; 280/259, 261; 180/65.5, 65.6; 310/83

[56] References Cited

U.S. PATENT DOCUMENTS

| | | | |
|---|---|---|---|
| 2,348,053 | 5/1944 | Bowker | 180/65.5 |
| 3,477,536 | 11/1969 | Carini | 180/65.5 |
| 3,533,484 | 10/1970 | Wood | 310/83 X |
| 3,566,165 | 2/1971 | Lohr | 180/65.5 |
| 3,897,843 | 8/1975 | Hapeman et al. | 180/65.5 |
| 4,539,497 | 9/1985 | Boyer | 310/83 |
| 4,799,564 | 1/1989 | Iijima et al. | 180/65.5 |
| 5,014,800 | 5/1991 | Kawamoto et al. | 180/65.5 X |
| 5,036,941 | 8/1991 | Denzin et al. | 180/65.5 X |
| 5,127,485 | 7/1992 | Wakuta et al. | 180/65.6 X |

FOREIGN PATENT DOCUMENTS

| | | | |
|---|---|---|---|
| 0396073 | 11/1990 | European Pat. Off. | 180/65.5 |
| 2743649 | 4/1978 | Fed. Rep. of Germany | 180/65.5 |
| 3632781 | 3/1988 | Fed. Rep. of Germany | 180/65.5 |

Primary Examiner—Vinh T. Luong
Attorney, Agent, or Firm—Jacobson, Price, Holman & Stern

[57] ABSTRACT

A flat rim type motor drive mechanism is disclosed for driving a bicycle which includes a motor having a rotor made of a multi-layer mylar film rotor coil and fastened inside a housing coupled to the spokes of either wheel of a bicycle, an epicyclic gearing fastened inside the housing and driven by the motor to rotate the wheel of the bicycle via the housing and the spokes, and a swivel type speed governor handle controlled to regulate the voltage and current from a DC power supply to the motor.

6 Claims, 9 Drawing Sheets

FLAT RIM TYPE MOTOR DRIVE MECHANISM FOR BICYCLES

BACKGROUND OF THE INVENTION

The present invention relates to a motor drive mechanism which can be conveniently mounted on the rim of either wheel of an existing bicycle and controlled to turn the wheel to propel the bicycle.

A variety of motor drive mechanisms are known and may be fastened to a bicycle for turning the wheels thereof automatically. However, the conventional motor drive mechanism is commonly heavy, consumes large amounts of electric power, and requires large installation space.

SUMMARY OF THE INVENTION

One object of the present invention is to provide a flat rim type motor drive mechanism for bicycles which is lightweight and needs less installation space. Another object of the present invention is to provide a flat rim type motor drive mechanism for bicycles which consumes less electric power. Still another object of the present invention is to provide a flat rim type motor drive mechanism for bicycles which provides a high torsional force for turning either wheel of a bicycle at 3600 rpm minimum. Still another object of the present invention is to provide a flat rim type motor drive mechanism for bicycles which can be conveniently fastened to either wheel of any of a variety of existing bicycles without changing the original pedal drive transmission mechanism of the bicycle.

DETAILED DESCRIPTION OF THE PREFERRED EMBODIMENT

Figure 1A:
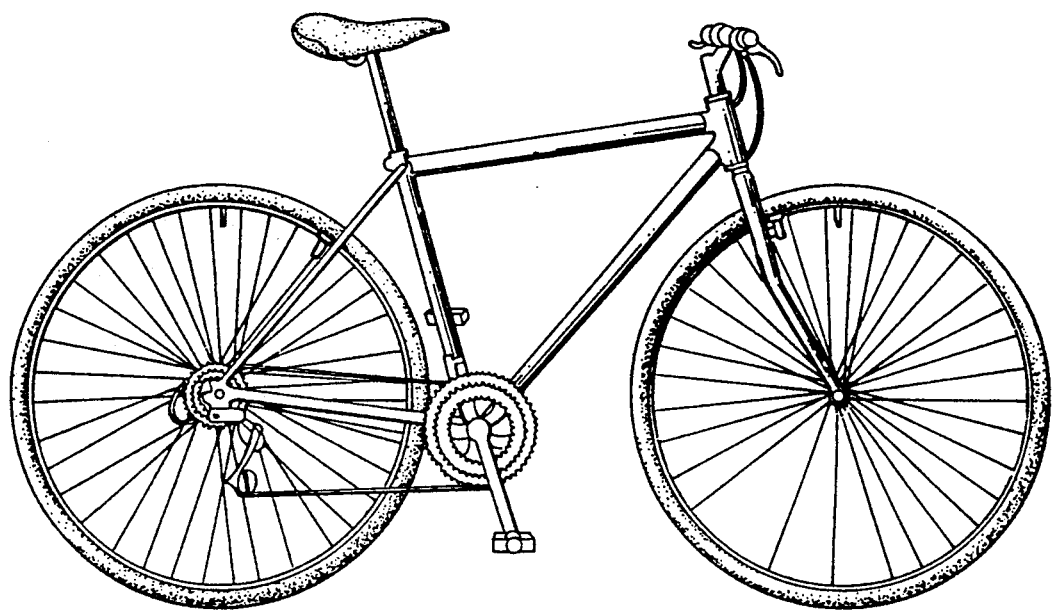
FIG. 1A is a drawing of a typical bicycle showing the differences in outer appearance to be used as a comparison with the drawing of FIG. 1B having a bicycle equipped with a flat rim type motor drive mechanism according to the present invention.
Figure 1B:
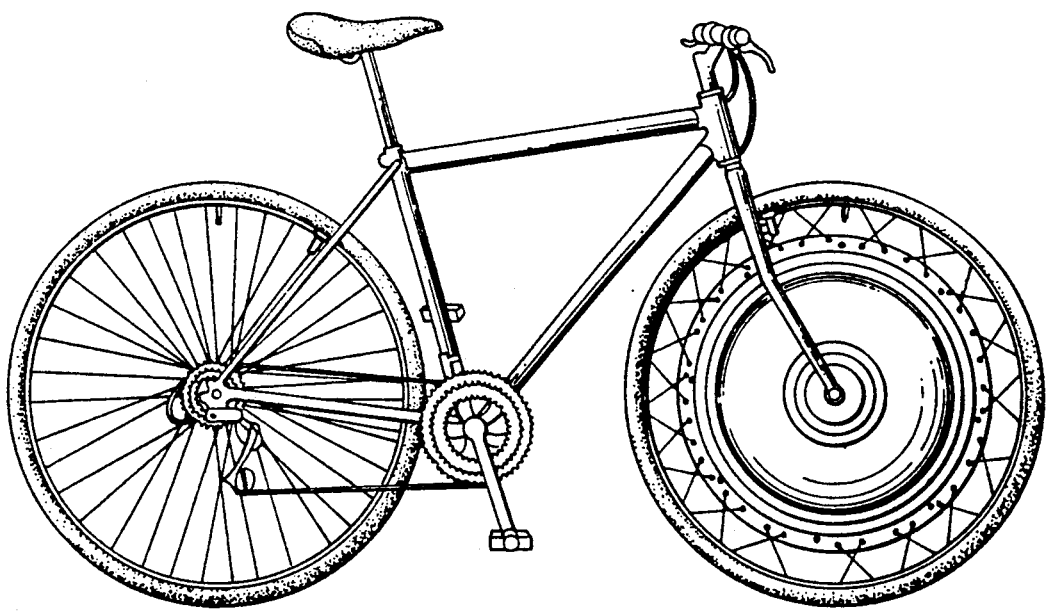

FIG. 1A illustrates an conventional bicycle A and FIG. 1B illustrates a bicycle equipped with a flat rim type motor drive mechanism B according to the present invention. The flat rim type motor drive mechanism needs less installation space and can be conveniently fastened to an ordinary bicycle without changing its original transmission mechanism. Therefore, a bicycle which is equipped with a flat rim type motor drive mechanism according to the present invention can be alternatively driven by motor power or pedals.

Figure 2:
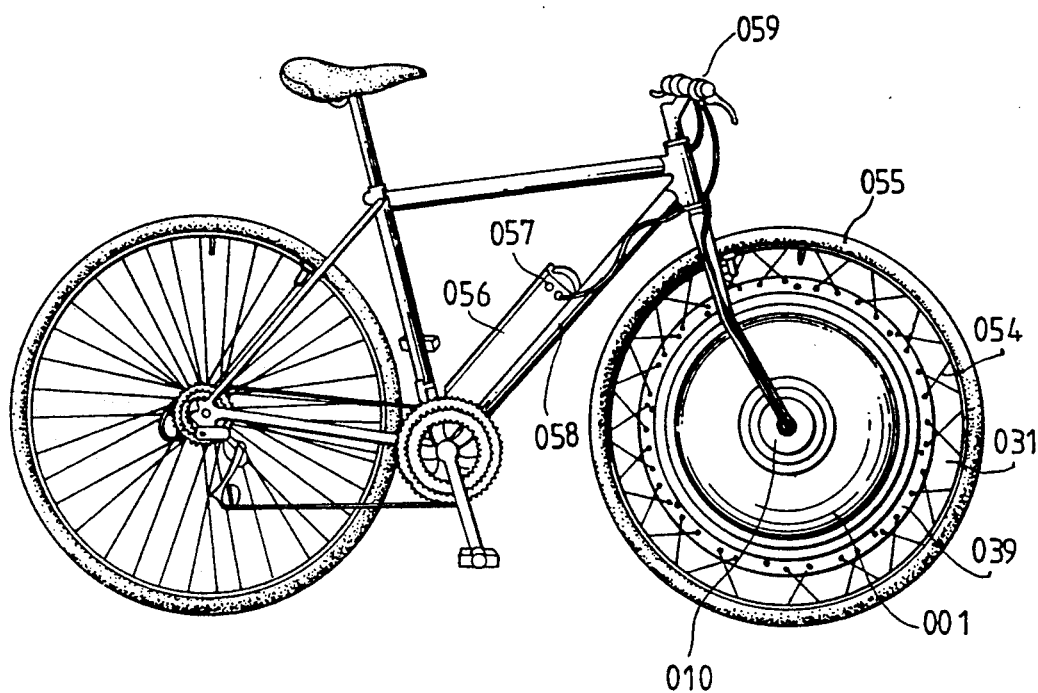
FIG. 2 is a plain view of a bicycle as constructed according to the present invention showing the arrangement of the motor, battery case, speed governor handle of the flat rim type motor drive mechanism.
Figure 3:
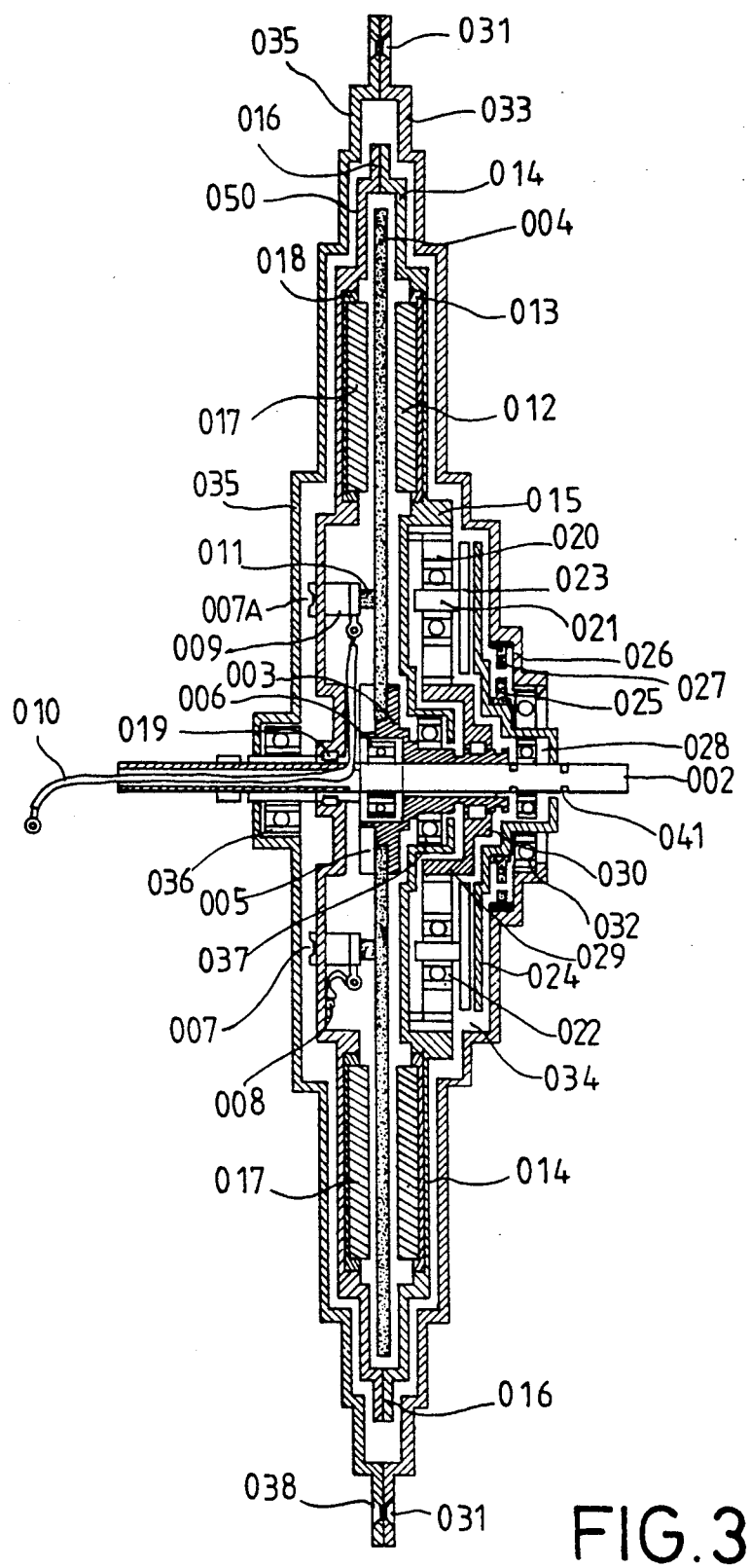
FIG. 3 is sectional assembly view of the flat rim type motor.
Figure 4:
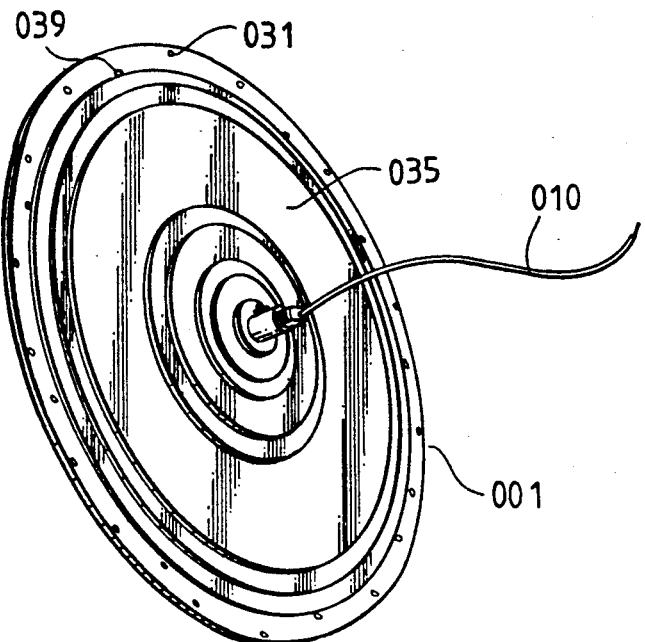
FIG. 4 is an elevational view of the flat rim type motor.
Figure 5:
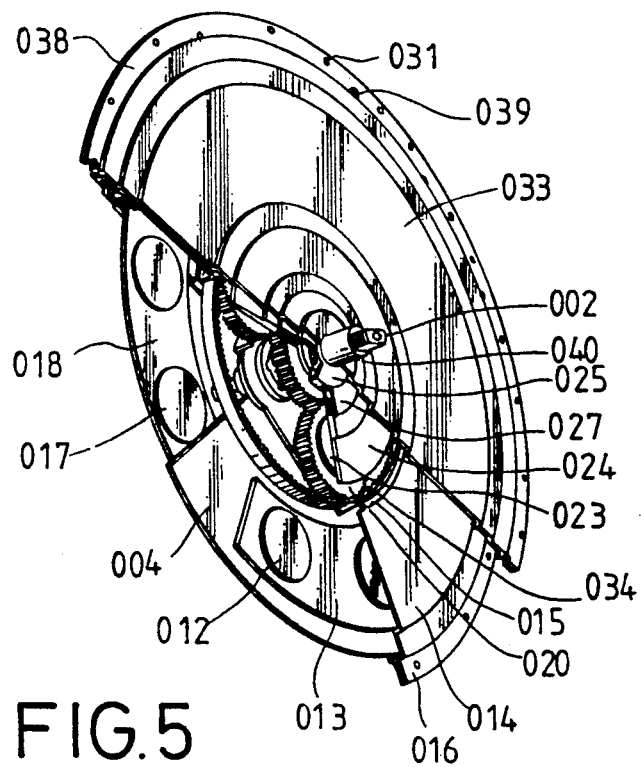
FIG. 5 is a partly broken view of the flat rim type motor.
Figure 6:
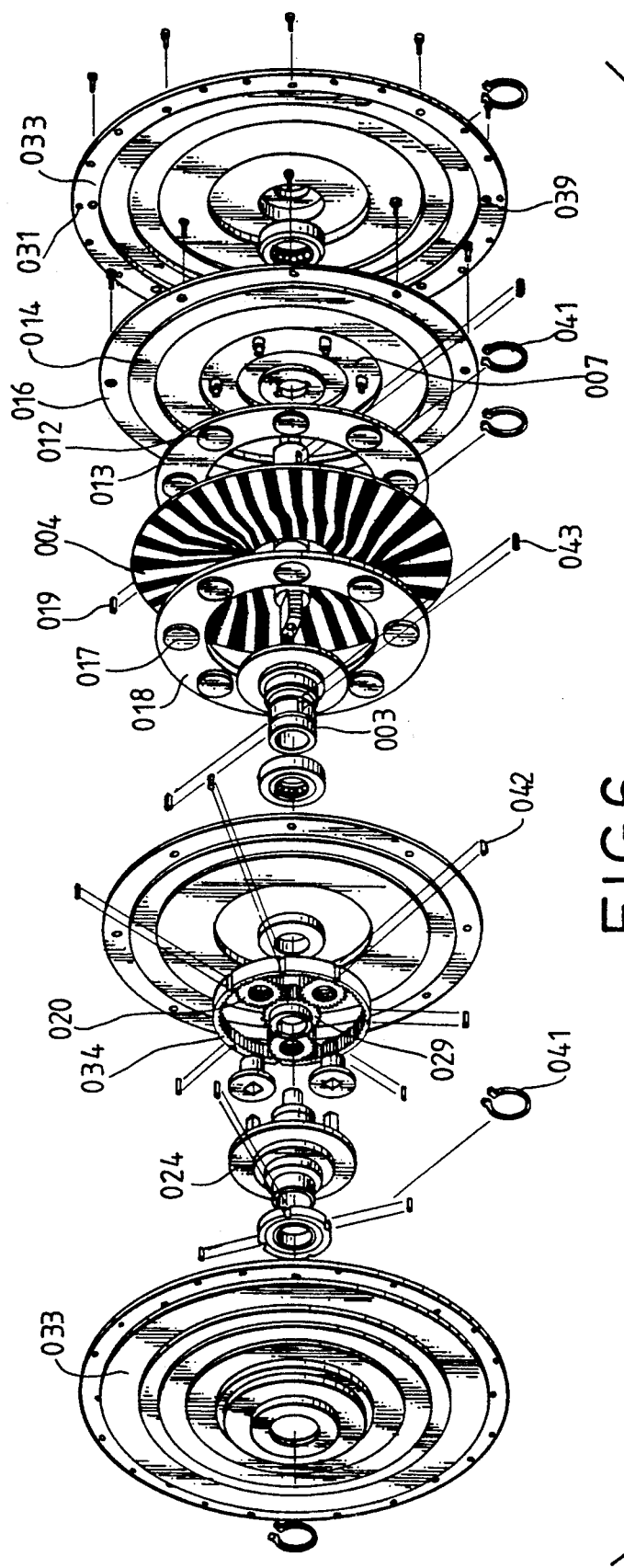
FIG. 6 is an exploded view of the flat rim type motor.
Figure 7:
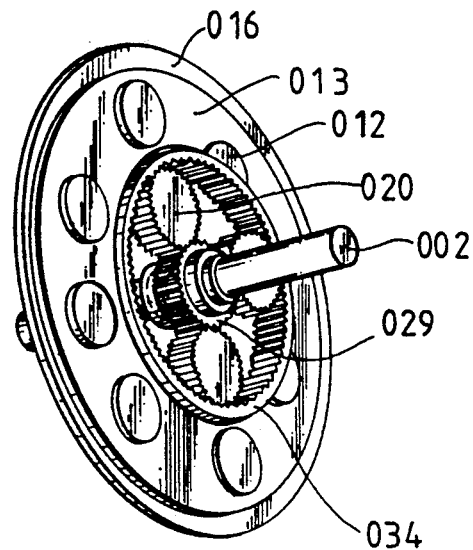
FIG. 7 illustrates the positioning of permanent magnets around an epicyclic gearing mechanism.
Figure 8:
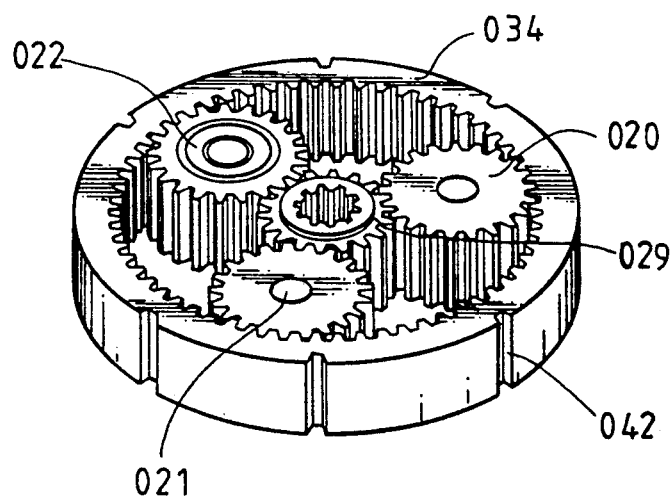
FIG. 8 is an elevational view of the epicyclic gearing mechanism.
Figure 9:
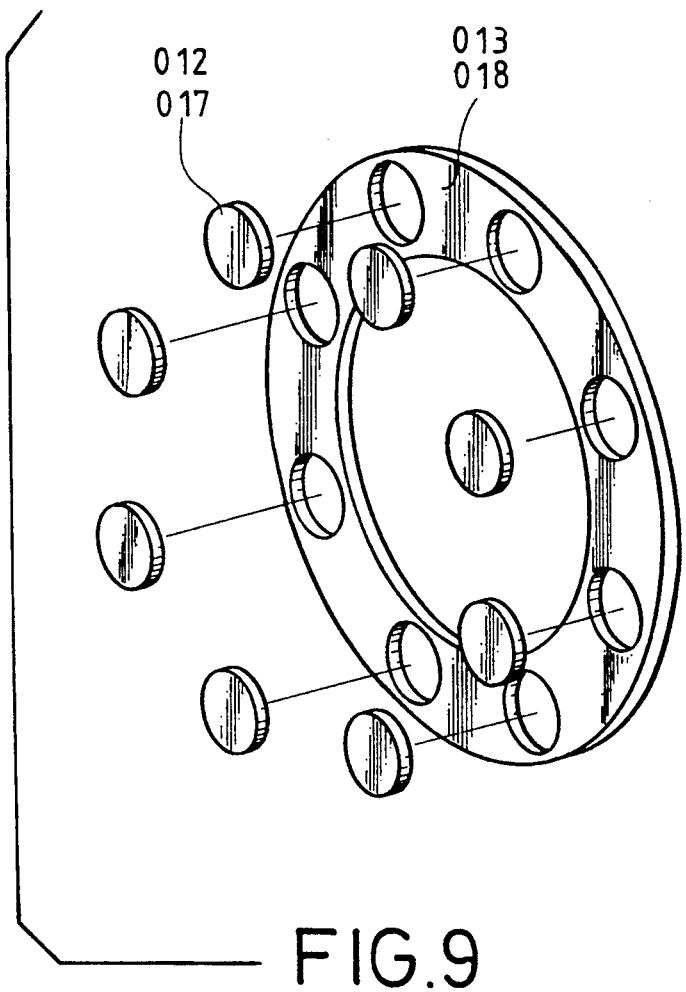
FIG. 9 illustrates the positioning of permanent magnets on a rotor according to the present invention.
Figure 10A:
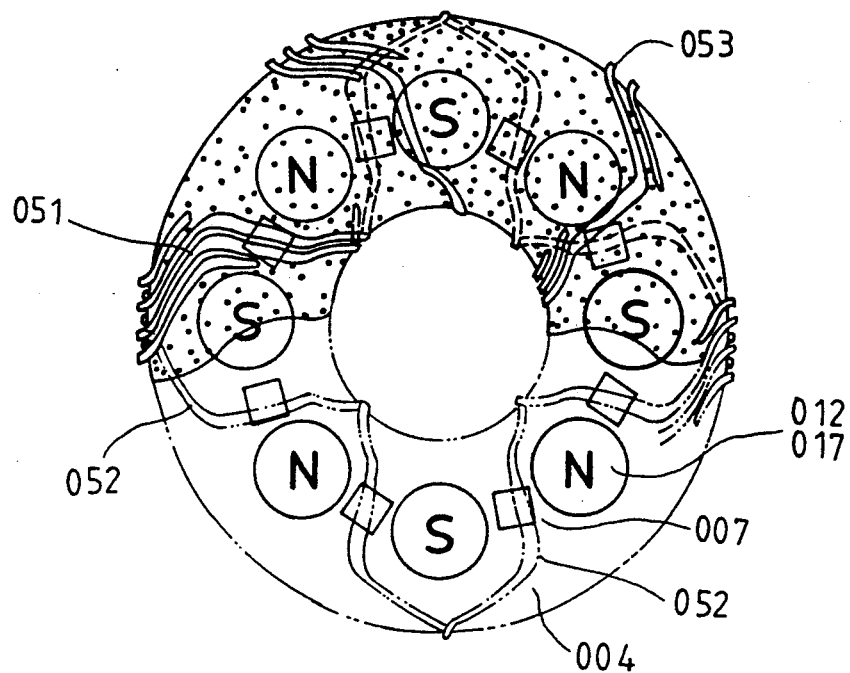
FIGS. 10A and 10B illustrate the internal structure of the multi-layer mylar rotor coil, permanent magnets, carbon brush, bearing block of the flat rim type motor drive mechanism.
Figure 10B:
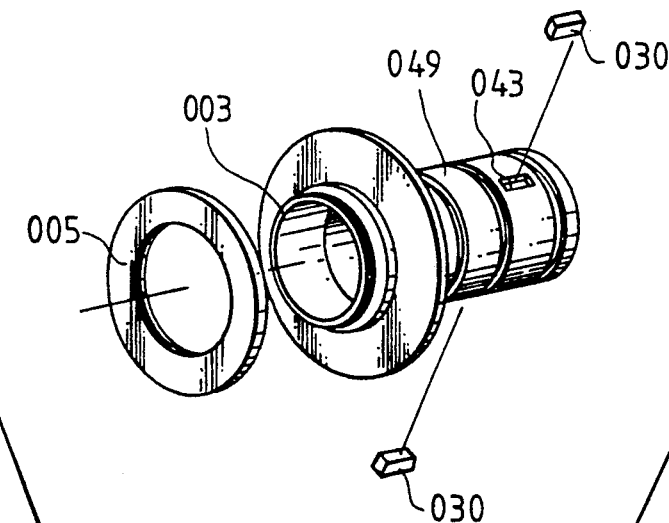
Figure 11:
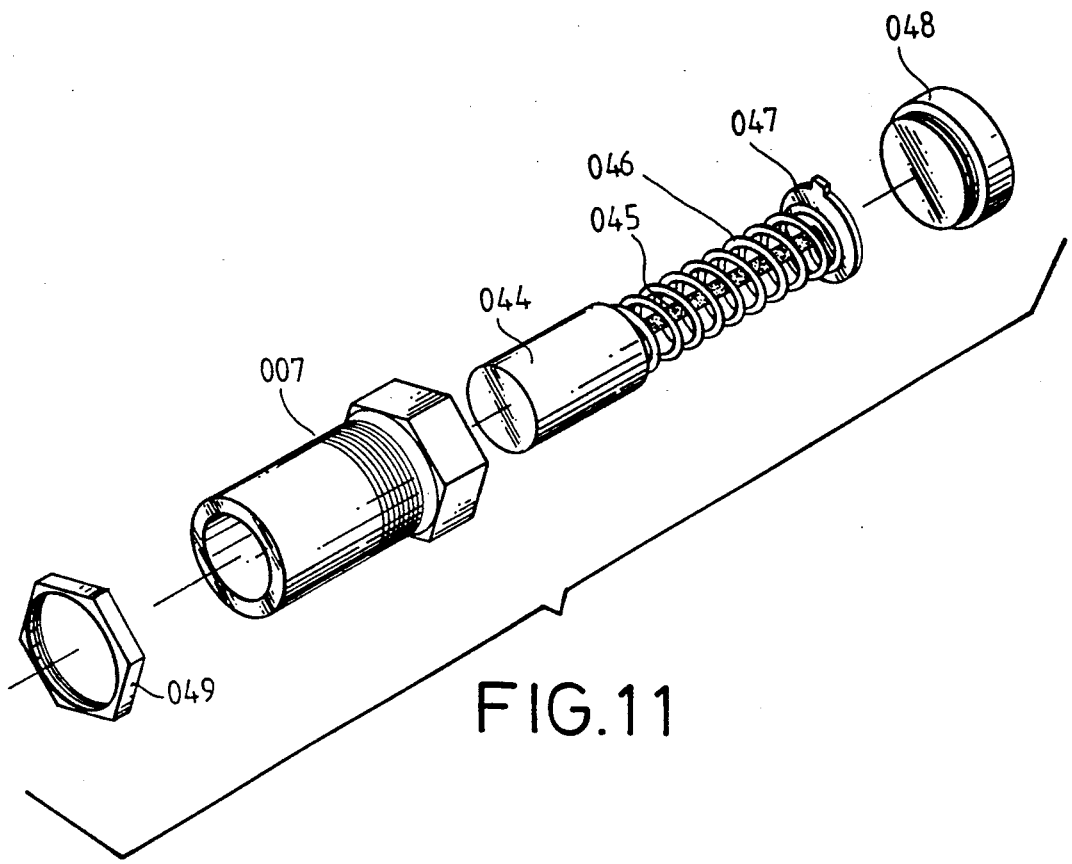
FIG. 11 is an exploded view of a carbon brush assembly according to the present invention.
Figure 12:
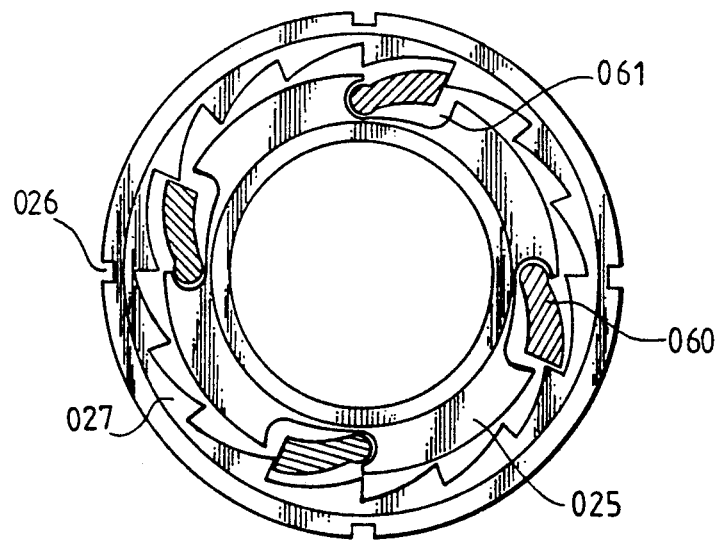
FIG. 12 illustrates a power transmission clutch mechanism according to the present invention.

Referring to FIG. 2, a flat rim type motor drive mechanism comprises a flat rim type motor 001 fastened to the spokes 054 of the front wheel 055 of a bicycle and electrically connected to the speed control receptacle 058 on a battery case 056, which is fastened to the down tube of the bicycle. The battery case 056 has a socket 057 for charging batteries in the battery case. By means of turning a speed governor handle 059, the revolving speed of the flat rim type motor 001, is controlled to adjust the speed of the bicycle.

Referring to FIGS. 3-12, the motor is described as having two sides, separated by the rotor 004. The "A" side corresponds to the right hand side of the rotor 004 (FIGS. 3 and 6), and the "B" side corresponds to the left hand side of the rotor. DC electric current is transmitted from the battery case 056 through the conductor 010, which is inserted through a hollow central shaft 002 on the wheel hub of the bicycle, to the terminal 009 on the positive carbon brush 007A of the B side stator housing 050. The conductor 010 is ultimately connected to the carbon brush element 011 of the positive carbon brush 007A, and to the rotor 004 of multi-layer mylar film rotor coil (see FIG. 10A). DC electric current from the rotor 004 is supplied through the negative carbon brush 007 on the A side to produce a magnetic line of force interacting with the magnetic line of force produced by the permanent magnets 012,017 on the A and B sides (see FIG. 9). Therefore, a high-power running torque is produced to rotate the rotor 004 and a bearing block 003. Turning the bearing block 003 causes the sun wheel 029 of an epicyclic gearing to drive three planet wheels 020. This turns a swivel block 024 via the wheel shafts 021 thereof, so as to further turn an inner clutch wheel set 025 (see FIG. 12). By means of the operation of the inner clutch wheel set 025, an outer clutch wheel set 027 is engaged to rotate. Because the outer clutch wheel set 027 is coupled to the A side rotor housing 033 by latch means 026, turning the outer clutch wheel set 027 causes the A side rotor housing 033 to rotate. The A side rotor housing 033 has screw holes 039 respectively connected to screw holes (not shown) on the B side rotor housing 035. Therefore, turning the A side rotor housing 033 causes the B side rotor housing 035 to drive the spokes 054 and turn directed the wheel 055.

As indicated, the present invention is directed to a flat rim type motor drive mechanism for a bicycle, having numerous features outlined as follows:

1. The motor is designed with a flat rim profile to extend the radius of the torque of the rotor 004 and increase the magnetic contact surface, and therefore a high-power torsional force can be quickly produced with less power consumption;

2. A multi-layer mylar film rotor coil is used to minimize the weight of the mechanism, and therefore is can be installed in an existing bicycle without adding much weight to it;

3. The epicyclic gearing and clutch wheel set is fastened inside the flat rim type motor to minimize the need for installation space; and 4. The present invention can be fastened to either wheel or both wheels of a bicycle for single wheel drive or double wheel drive control.

What is claimed is:

1. A low profile rim type motor drive mechanism for a bicycle comprising a housing adapted to be fastened to the spokes of a bicycle wheel, a motor disposed inside said housing and including a rotor made of a multilayer mylar film rotor coil, a hollow central shaft adapted to be fixed to a central hub of the bicycle wheel, a DC power supply adapted for mounting to the frame of said bicycle, a DC power input cable inserted through said hollow central shaft and connected between said motor and said DC power supply, an epicyclic gearing mechanism disposed inside and attached to said housing which is driven by said motor to turn said housing for rotating the bicycle wheel.

2. The motor drive mechanism of claim 1, and further comprising speed control means adapted to be mounted on a handlebar of said bicycle and connected to said DC power supply for regulating voltage and current from the DC power supply delivered to said motor.

3. The motor drive mechanism of claim 2, wherein said speed control means comprises a rotatable speed governor handle capable of regulating the voltage and current from the DC power supply according to its rotational position.

4. The motor drive mechanism of claim 1, wherein said motor further comprises first and second discs on opposite sides of said rotor coil, each disc supporting an circumferentially disposed array of permanent magnets which interact with said rotor to cause rotation of said rotor.

5. The motor drive mechanism of claim 4, and further comprising a bearing block attached to said rotor to rotate with said rotor, and wherein said epicyclic gearing mechanism is connected to said bearing block to rotate in response to rotation of said bearing block.

6. The motor drive mechanism of claim 1, and further comprising a clutch mechanism connected to said epicyclic gearing mechanism and to said housing for rotating said housing in response to rotation of said epicyclic gearing mechanism which in turn causes rotation of said bicycle wheel.

* * * * *